Dec. 14, 1954 V. SALIERNO 2,696,756
SPECTACLE FRAME
Filed Jan. 21, 1950 3 Sheets-Sheet 3
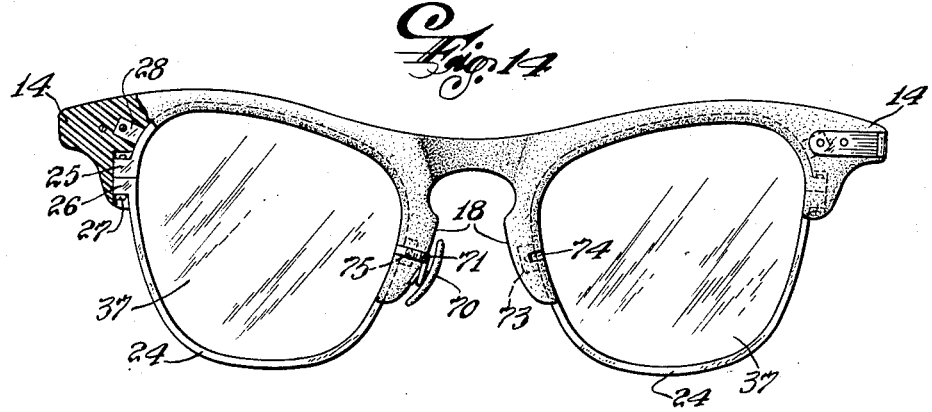
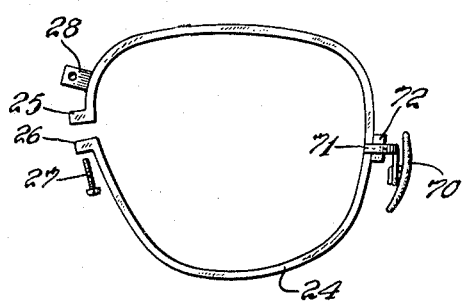
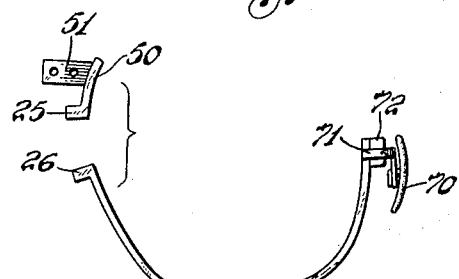
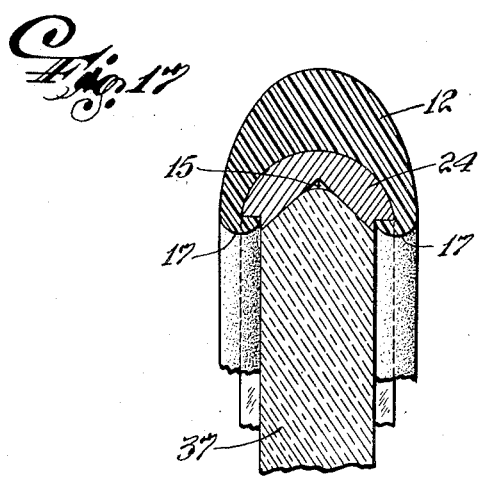
INVENTOR.
Vincent Salierno
BY
Angelo M. Pisarra
ATTORNEY

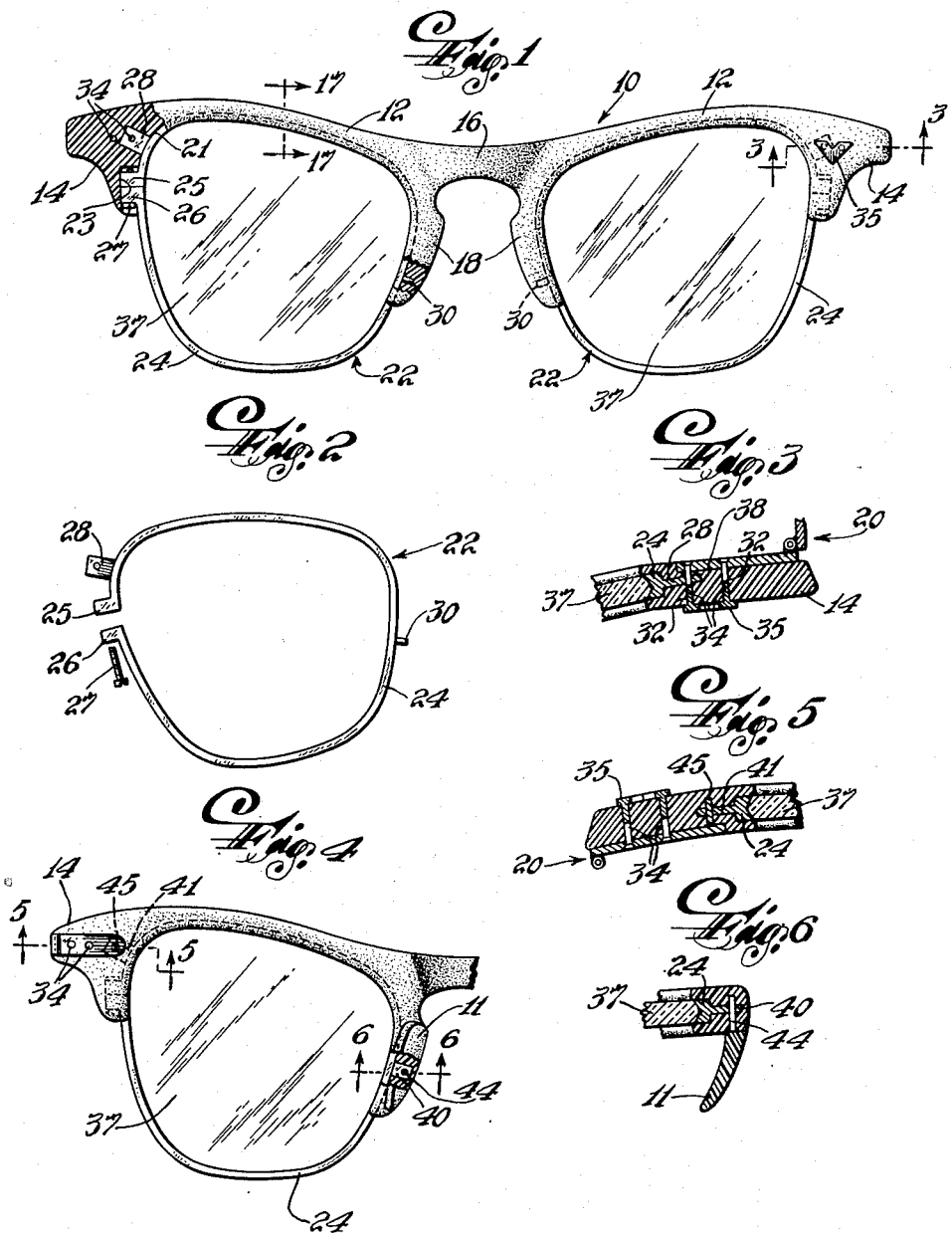

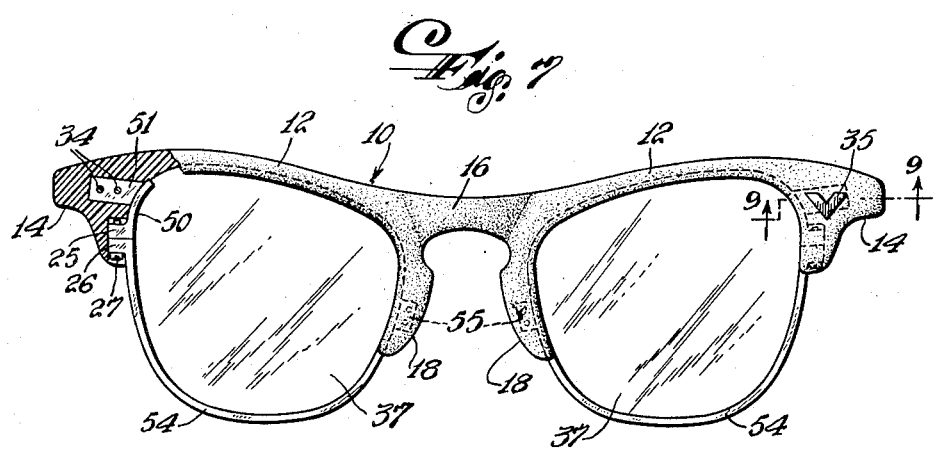
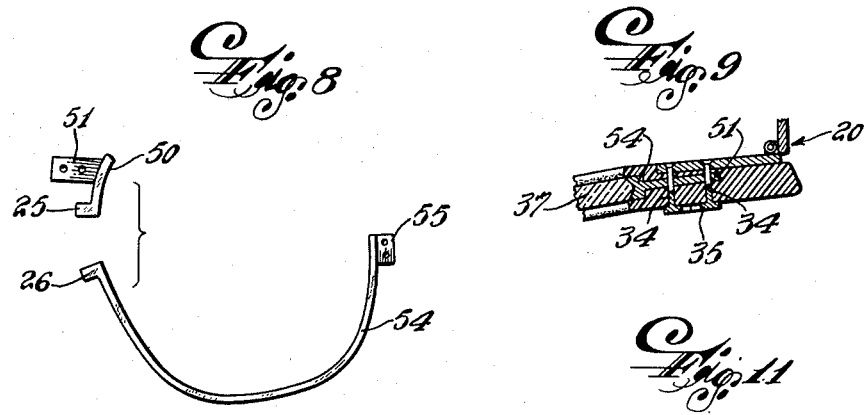

United States Patent Office 2,696,756
Patented Dec. 14, 1954

2,696,756

SPECTACLE FRAME

Vincent Salierno, Belleville, N. J.

Application January 21, 1950, Serial No. 139,807

7 Claims. (Cl. 88—41)

This invention relates to ophthalmic mountings and more particularly to spectacle frames, the top arms or reaches of which are composed of a plastic material. The main purpose of this invention is to provide novel spectacle frames, the top arms of which are composed of a plastic composition in combination with lower sections composed of some other material and cooperating with said top arms for maintaining lenses in position. The novel frames of this invention are of a very attractive design and may be readily and easily produced at a relatively low cost and are of rugged construction and design. These as well as other objects and advantages of this invention will be readily apparent from the following description taken in conjunction with the appended drawings, wherein:

Fig. 1 is a front view of a spectacle frame with certain parts broken away and illustrates an embodiment of this invention.

Fig. 2 is a front view of the lens receiving band together with the positioning and anchoring members shown in Fig. 1 and illustrates the condition of the lens receiving band before assembly and also shows the lock screw in disassembly.

Fig. 3 is an enlarged cross sectional view taken on line 3—3 of Fig. 1 in the direction of the arrows.

Fig. 4 is a fragmentary view essentially in rear elevation and broken away, partly in section and illustrates a modification of the anchoring and positioning means shown in Fig. 1.

Figs. 5 and 6 are enlarged cross sectional views taken on lines 5—5 and 6—6 respectively of Fig. 4.

Fig. 7 is a view similar to Fig. 1 and illustrates another embodiment of the invention.

Fig. 8 is a front view of the lens receiving band and connector as shown in Fig. 7 with these parts being in disassembly and the locking screw omitted.

Fig. 9 is a cross sectional view taken on line 9—9 of Fig. 7.

Figs. 10 and 11 are perspective views of the anchoring tab shown in Figs. (1 and 3–6) and Figs. (7–9) respectively.

Figs. 12 and 13 are perspectives of modifications of the anchoring tabs of Figs. 1–11.

Fig. 14 is a fragmentary rear view showing another modification of the invention, with the support and nose pad being omitted on one side to show the receiving slot and recess.

Figs. 15 and 16 are views similar to Figs. 8 and 12 and show another modification of the invention.

Fig. 17 is an enlarged view taken on line 17—17 of Fig. 1.

As shown in the drawings, the embodiment of the invention illustrated in Fig. 1 is a spectacle frame comprising a spectacle front 10 composed of a plastic material and preferably one of a thermoplastic nature such as zylonite or the like. The front 10 is of the type commonly known to the art as the top arm or semi-rimless frame. The front 10 is usually a single unitary element having a pair of nose pads 11 adhesively secured thereto. The front 10 comprises a pair of top arms 12 terminating at their outer ends in end pieces 14 and connected to each other at their opposite inner portions by a bridge 16 and terminating in opposite nose pieces 18 diverging from each other and carrying the inwardly extending nose pads 11. Temples, not shown, are hingedly secured to the upper part of the end pieces 14 by hinges 20.

The lower or inner periphery of the front piece 10, with the exception of the bridge 16, is recessed throughout the entire length thereof to provide a pair of grooves or slots 21 for receiving lens-holder bands 22. The lower part of each end piece 14 is further recessed to provide an enlarged groove or recess 23 communicating with recess 21 and serving to receive the enlarged joint of the narow band 22. As shown in Figs. 1 and 2, the novel band 22 comprises a narrow somewhat flexible metallic band lens holder 24. The holder 24 is of any desired shape and in this embodiment of the invention is in the form of a split ring whose upper part conforms to the general configuration of the inner periphery of the ends 14, nose pieces 18 and arms 12 of front 10. The ends of the band 22, which are normally apart from each other, have joint members or lugs 25 and 26 integral therewith. The lug 26 has an opening therethrough for accommodating a lock bolt or screw 27 which may make a threaded connection with the internally threaded lug 25 for locking together the ends of band 24. Disposed just above the normally upper lug 25 and integral with band 24 is an outwardly extending anchoring and positioning member 28 in the nature or form of a thin yet rigid metallic strip. The member 28 is disposed in such a position on the band 24 so that in the complete frame assembly it projects into the end piece 14 of the frame 10 and has an opening therethrough for accommodating a lock or retaining pin. Also integral with the band 24 and extending outwardly therefrom is a short thin anchoring and positioning locator pin 30. The pin 30 may be disposed to the side of the band 24 and in such a position that upon frame assembly it extends into the nose piece 18. The band 24 has an inner lens-receiving groove 15 extending around the entire length thereof, and a pair of outer lock grooves extending around the entire length thereof and defining shoulders 17.

The front element 10 may have a recess in each end piece 14 and in each nose piece 18 for accommodating the elements 28 and 30 respectively of bands 24. Each end 14 has a pair of spaced transverse openings 32 therethrough for accommodating locking pins 34 integral with and extending from shield 35.

In the assembly of the novel frame shown in Fig. 1 the front element 10 is laid flatwise then the band structure shown in Fig. 2 is coupled therewith by first properly positioning the band 22 and inserting the prong or pin 30 into a shallow preformed recess in the nose piece 18, while the end piece 14 is sprung out by hand and the strip 28 is inserted into a preformed recess in the end piece 14 so that the opening through strip 28 is in registry with an opening 32. If desired, the recess for accommodating the prong 30 may be eliminated and in this case the prong 30 is first heated and inserted in its heated condition into the nose piece which may also be in heated condition sufficient to soften it. It is also within the purview of this invention that the strip 28 also be heated and, while in this condition, be inserted into the end piece 14, which may also be in softened condition by heat, thus eliminating the necessity of providing an opening in said end piece. When such a procedure is to be followed, I prefer that the strip 28 be composed of a rigid yet flexible very thin metallic member such as that used in the finished double edge razor blades commonly known on the market in the United States of America as "Gillette" blue blades and also as "Gillette" thin blades, which are of blue and gold color respectively. The edges, and especially the leading edge of the tab, are sharpened to a razor edge to aid in the insertion process. By employing such a strip 28 more than adequate anchoring may be accomplished and at the same time the flexibility of the end piece is not appreciably reduced. With the positioners 28 and 30 so located, the upper part of the band 24 is disposed in the groove 21 and the lug 25 is disposed at the upper end of the recess 23.

The shield 35 is loacted at the front side of each end 14 and the retaining pins 34 pass through openings 32, through the transverse opening in strip 28 and through openings in an arm of hinge 20 disposed in recess 38 as the rear face of end 14. The inner ends of pins 34 are upset or peened over to lock the shield, hinge and retainer 28 to the end of the frame. The edges of the plastic member 10, which also may be first softened, are lapped over and into the grooves and against shoulders 17 to firmly lock and retain the band 24 in rigidly coupled relationship thereto as shown in Fig. 17. The upper lug 25 is located in the upper part of recess 23 and the lower lug 26 in the lower part thereof. A lens may be coupled therewith by first removing the lock-screw 27, whereupon the band 24 separates; the lens 37 may be inserted in the inner lens receiving groove 17 of the band 24. Then the lug 26 is moved up to lug 25 to firmly couple the lens 37 in band 24 and the screw 27 inserted through lug 26 and threaded in lug 25 to lock the ends of band 24 together to hold and anchor the lens in the band. Of course, two bands such as shown in Fig. 2 are employed with one coupled to each of the arms 12.

In another embodiment of the invention, as shown in Figs. 4–6, in place of the pin 30 a tab 40 may be employed and a tab 41 similar to, but shorter than, tab 28 may be employed in place of tab 28. Both tabs 40 and 41 have transverse openings therethrough to accommodate retaining pins 44 and 45 respectively. A blind pin 44 at elevated temperature may be forced from the rear face of the nose piece 18 through opening in tab 40 and therebeyond, so that the front end of the pin 44 terminates just short of the front face of the nose piece and the rear end of pin 44 is flush with the rear face of said nose piece. The pad 11 may then be positioned to cover the exposed end of the pin 44 and is adhesively secured to the nose piece 11; thus there is provided a blind retaining pin for locking the tab 40 to the nose piece and at the same time completely masking the retaining pin 44. The tab 41 is inserted in the end 14 in the same manner that tab 28 may have been inserted. In this embodiment the tab 41 is located out of the area through which the normal transverse openings 32 are located, but is located to one side of them. A transverse preheated pin 45 is forced through the rear face of the end 14 through opening in tab 41 and terminates inside of outer face of end 14. If desired, the arm of hinge 20 may be of such a length as to cover the exposed end of pin 45.

In the embodiment of the invention illustrated in Figs. 8–10, a full split ring 24 is not employed. As shown therein, there is provided a relatively short arcuate metallic section or piece 50 having the lug 25 integral therewith at the lower end thereof and an outwardly extending tab 51 similar to tab 28, but of a greater length. The strip 51 has a pair of preformed spaced openings therein for accommodating both retaining pins 34 of shield 35. The length of the arcuate section 50 is preferably such that in assembly, this section does not extend to any appreciable degree along the length of the arms 12, but is located along the end piece 14 so that the arms 12 are free of any portion of a retaining band. A roughly half or semi-ring 54 has lug 26 integral therewith at one end thereof and a tab 55 integral therewith at the other end thereof. The tab 55 also has a pair of spaced transverse openings therethrough. In assembly the arcuate section 50 is located in a recess in the end piece 14 with the lug 25 located at the upper end of slot 23 and the strip 51 is located in end 14 in the manner of locating strip 28. In this instance the openings in strip 51 are in registry with openings 32; and the shield 35, arm of hinge 20 and strip 51 are all coupled to the end of the frame by the pins 34, as shown in Fig. 10. The tab carrying end of semi-ring 54 is located in a recess at the lower end of nose piece 18 and the strip 55 is located in a recess in said nose piece. Then a pair of blind retaining pins pass from the rear face of the nose piece through the openings in strip 55 and terminate short of the front face of the nose piece. The pad 11 may be adhesively secured to the rear face of the nose piece 18 to mask the exposed ends of the retaining pins. The members 51 and 54 have recesses or grooves 15 and the arms 12 and nose pieces 11 also have grooves for accommodating lens 37. The lug carrying ends of the members 51 and 54 may be locked together by screw 27.

The retaining tabs or strips 28, 40, 41, 51 and 55 may be serrated as shown in Fig. 13 or may have struck out portions as shown in Fig. 14 to provide gripping or locking members 60 which are inclined, with the incline being in a direction from the extreme outer end of the tab towards the member such as 24, 50 or 54 with which it is coupled. This permits ready insertion and after the faces of the ends 14 are pressed towards each other, the material of the ends flow into the spaces or grooves adjacent the inclines 60 to lock the tabs and prevent them from being pulled out. Such tabs may be used with or without having either one of both of the retaining pin accommodating openings therethrough, although they are shown in the embodiments illustrated.

In the embodiment of the invention shown in Fig. 14, the plastic nose pads 11 may be eliminated and in their place I employ a pair of automatically adjustable nose pads 70. Each nose pad 70 is so mounted at one end of a narrow support 71 that it is freely swingable in a number of different directions so as to be automatically adjustable on the nose of the wearer. The other end of support 71 has a short strip or tab 72 integral therewith and extending therefrom.

The strip 71 may be of the type shown in Figs. 10–13, but as shown, is of the type shown in Fig. 10. The end of the support 71, at which the tab 72 is located, is welded, brazed or in any other convenient manner secured to the outer side face of the band 24 at the same position as the member 30 is located in the embodiment of Fig. 2 and in place of member 30 to provide the combination shown in Fig. 15. In assembly, I prefer that the lens receiving side of each nose piece 18 have a recess 73 to accommodate tab 72 and a slot 74 on the rear of the nose piece and communicating with the recess 73 to permit insertion of the tab 72 and support 71 in proper position. After insertion a blind pin 75 which terminates just short of the outside face of nose piece 18 extends into nose piece 18 and through one or more openings through tab 72, only one opening being shown for the purposes of illustration. This pin passing through tab 72 fixes the tab in position so that the band 24 and the support of rocking nose pads 70 are anchored in position. The tab 28 is anchored to end 14 in the herein before described manner.

Still another modification is shown in Fig. 17, and in this instance the subassembly of support 71, carrying automatically adjustable nose pads 70 and anchoring and positioning tab 72, is coupled with the semi-ring 54 in place of tab 55 and may be mounted to provide an assembly shown in Fig. 17. The plastic element 10 which is to receive the assembly shown in Fig. 15 is recessed as slotted, as was the member 10 of Fig. 14; and the assembly of Fig. 15 is mounted therein to provide a complete assembly similar to that of Fig. 7 except for the nose pads and supports therefor.

It is to be understood, of course, that while in some of the descriptions the singular has been employed, a pair of each of the various elements are used together with each front 10 to provide spectacle frames.

This application is a continuation-in-part of my copending application Serial No. 111,425 filed August 20, 1949, now Patent No. 2,655,835, issued October 20, 1953.

I claim:

1. A spectacle frame comprising a semi-rimless plastic top unit having two sets of members connected to each other by a bridge, with each set including an arm, an end piece integral with one end of said arm and extending outwardly therefrom and an extension integral with the other end of said arm and extending downwardly therefrom, each set having an inner groove therein, a split ring holder for a lens, a portion of said ring located in said groove, a retaining member secured to said ring holder at about the mid-length thereof and having an opening therethrough, said retaining member extending outwardly from said ring holder and into one of said extensions, means extending in said extension and through the opening of said retainer member to lock said retainer member thereto, an element secured to said ring holder near one end thereof, extending outwardly therefrom and having an opening therethrough, a shield disposed at the normally front side of one of said end pieces and an arm of a temple hinge disposed on the normally rear side of said end piece and means extending through said end piece and said opening in said element and cooperating with said shield and arm of said hinge to lock said hinge, shield and element to said end piece.

2. A spectacle frame comprising a semi-rimless plastic top unit having two sets of members connected to each other by a bridge, with each set including an arm, an end piece integral with one end of said arm and extending outwardly therefrom and an extension integral with the other end of said arm and extending downwardly therefrom, each set having an inner groove therein, a split ring holder for a lens, a portion of said ring located in said groove, a retaining member secured to said ring holder and extending outwardly therefrom, said retaining member extending into one of said extensions, an arm secured to said ring holder at a position near said retaining member, and having a nose pad rockingly coupled thereto, an element secured to said ring holder near one end thereof and extending outwardly therefrom, said element extending into said end piece and being coupled thereto, said element having an opening therethrough and extending into said end piece, a shield on the normally front side of said end piece and means secured to said shield, extending into said end piece and through said opening in said element, for maintaining said shield and element to said end piece.

3. A spectacle frame comprising a semi-rimless plastic top unit having two sets of members connected to each other by a bridge, with each set including an arm, an end piece integral with one end of said arm and extending outwardly therefrom and an extension integral with the other end of said arm and extending downwardly therefrom, each set having an inner groove therein, a split ring holder for a lens, a portion of said ring located in said groove, a retaining member secured to said ring holder and extending outwardly therefrom, said retaining member extending into one of said extensions, an arm secured to said ring holder at a position near said retaining member, and having a nose pad rockingly coupled thereto, an element secured to said ring holder near one end thereof and extending outwardly therefrom, said element extending into said end piece and being coupled thereto, said element having an opening therethrough and extending into said end piece, a shield at the normally front side of said end piece, an arm of a temple hinge at the normally rear side of said end piece, said arm having an opening therethrough, a pin integral with said shield, extending through said end piece and through the openings in said element and said arm to lock said shield, hinge and element to said end piece.

4. A spectacle frame comprising a semi-rimless plastic top member having two sets of members connected by a bridge with each set including an arm, an end piece extending outwardly from one end of said arm, and an extension extending downwardly from the other end of said arm, a groove in the inner margin of said end piece, means located in said groove and carrying an element extending into said end piece, a threaded lug secured to said means, said element having an opening therethrough, a hinge plate on the rear face of said end piece, said element spaced from said hinge plate, with a portion of said end piece located between said hinge plate and said element, means connected to said hinge plate, extending into said end piece and through the opening in said element to lock said element to said end piece, a metallic band, means secured to said band at one end thereof, extending outwardly therefrom and located in said extension, a lug secured to the other end of said band and means cooperating with said lugs and tending to force them towards each other for maintaining a lens between said band and said top member.

5. A spectacle frame comprising a substantially semi-rimless plastic upper member, said upper member comprising a pair of arms connected to each other at their inner ends by a bridge and terminating in end pieces at their outer ends, extensions extending downwardly from the inner ends of said arms, a hinge-plate disposed at the normally rear face of each of said end pieces, lens receiving metallic bands for bridging the spaces normally below and between said end pieces and said extensions, means for anchoring said bands to said end pieces, each of said last mentioned means comprising an element having an opening therethrough and extending into one of said end pieces, and a pin in each said end pieces, said pins connected to said hinge plates and extending through said openings in said elements and on a line from the normally rear face to the normally front face of each of said end pieces, said element spaced from said hinge plate, with a portion of said end piece being between said element and said hinge plate, said element located in a plane approximately parallel to and between the plane of said hinge plate and the plane of the normally front face of said end piece, a lug adjacent to said element, means to connect said lug and said element, a lug connected to one end of said band, and means for maintaining said lugs towards each other.

6. A spectacle frame comprising a semi-rimless plastic top unit having two sets of members connected to each other by a bridge, with each set including an arm, an end piece integral with one end of said arm and extending outwardly therefrom and an extension integral with the other end of said arm and extending downwardly therefrom, each set having an inner groove therein, a hinge plate located at the normally rear face of each of said end pieces, a split ring holder for a lens, a portion of said ring located in said groove, a locator secured to said ring and extending into one of said extensions, an element secured to said ring holder, said element having an opening therethrough and extending into one of said end pieces, said element being disposed in a plane approximately parallel to the normally forward and rear faces of said end piece, said element being spaced from said hinge plate, with a portion of said end piece located between said element and hinge plate, a shield on the normally front side of each of said end pieces, means secured to said shield, connected to said hinge plate, extending into said end piece and through said opening in said element to lock said shield and said element to said end piece.

7. A spectacle frame comprising a semi-rimless plastic top unit having two sets of members connected to each other by a bridge, with each set including an arm, an end piece integral with one end of said arm and extending outwardly therefrom and an extension integral with one end of said arm and extending outwardly therefrom and an extension integral with the other end of said arm and extending downwardly therefrom, each set having an inner groove therein, a split ring holder for a lens, a portion of said ring located in said groove, a retaining member secured to said ring holder at approximately the mid-length thereof, said retaining member extending outwardly therefrom and extending into one of said extensions, an element secured to said ring holder near one end thereof, said element extending outwardly therefrom and having an opening therethrough, a shield disposed at the normally front side of one of said end pieces and an arm of a temple hinge disposed on the normally rear side of said end piece, said element located in said end piece and disposed between said shield and arm, and means extending through said end piece and said opening in said element and cooperating with said shield and arm of said hinge to lock said hinge, shield and element to said end piece.

References Cited in the file of this patent

UNITED STATES PATENTS

| Number | Name | Date |
|---|---|---|
| 2,284,630 | Banks | June 2, 1942 |
| 2,329,100 | Chappell | Sept. 7, 1943 |
| 2,355,053 | Carlson | Aug. 8, 1944 |
| 2,450,711 | Bouchard | Oct. 5, 1948 |
| 2,478,334 | Splaine | Aug. 9, 1949 |